United States Patent [19]

Shiota et al.

[11] Patent Number: 4,542,984

[45] Date of Patent: Sep. 24, 1985

[54] METHOD FOR DETECTING DEFOCUSED PHOTOGRAPHIC IMAGE

[75] Inventors: Kazuo Shiota; Kenji Suzuki, both of Minami-ashigara; Takashi Fukui, Tokyo, all of Japan

[73] Assignee: Fuji Photo Film Co., Ltd., Kanagawa, Japan

[21] Appl. No.: 466,559

[22] Filed: Feb. 15, 1983

Related U.S. Application Data

[63] Continuation-in-part of Ser. No. 379,989, May 19, 1982, abandoned.

[30] Foreign Application Priority Data

May 25, 1981 [JP] Japan ............ 56-78926

[51] Int. Cl.[4] ................................ G03B 27/72
[52] U.S. Cl. .................................. 355/68; 355/77; 250/201; 356/125
[58] Field of Search .............. 355/68, 41, 38, 77; 356/404, 125; 354/400, 401; 250/201 PF

[56] References Cited

FOREIGN PATENT DOCUMENTS 3111960 3/1982 Fed. Rep. of Germany ........ 355/68
137340 10/1981 Japan .
70428 6/1978 Japan .

OTHER PUBLICATIONS

U.S. Application Ser. No. 251,098, filed 4/6/81, Inventor—Takashi, Fukui; abandoned 8/17/84.

Primary Examiner—L. T. Hix
Assistant Examiner—Della J. Rutledge
Attorney, Agent, or Firm—Wenderoth, Lind & Ponack

[57] ABSTRACT

When a photographic film is to be printed, it is necessary to remove such defocused photographic images which are caused by improper focusing. In this invention, transmittivity or transmission density of an image recorded on photographic film is measured consecutively by scanning it with two photometric systems having different measuring areas, and a defocused photographic image is detected from the relation between the measured distribution of the difference between two measured values in the transmittivity and the contrast values which is obtained by totalling local contrasts measured all over the photographic film.

9 Claims, 12 Drawing Figures

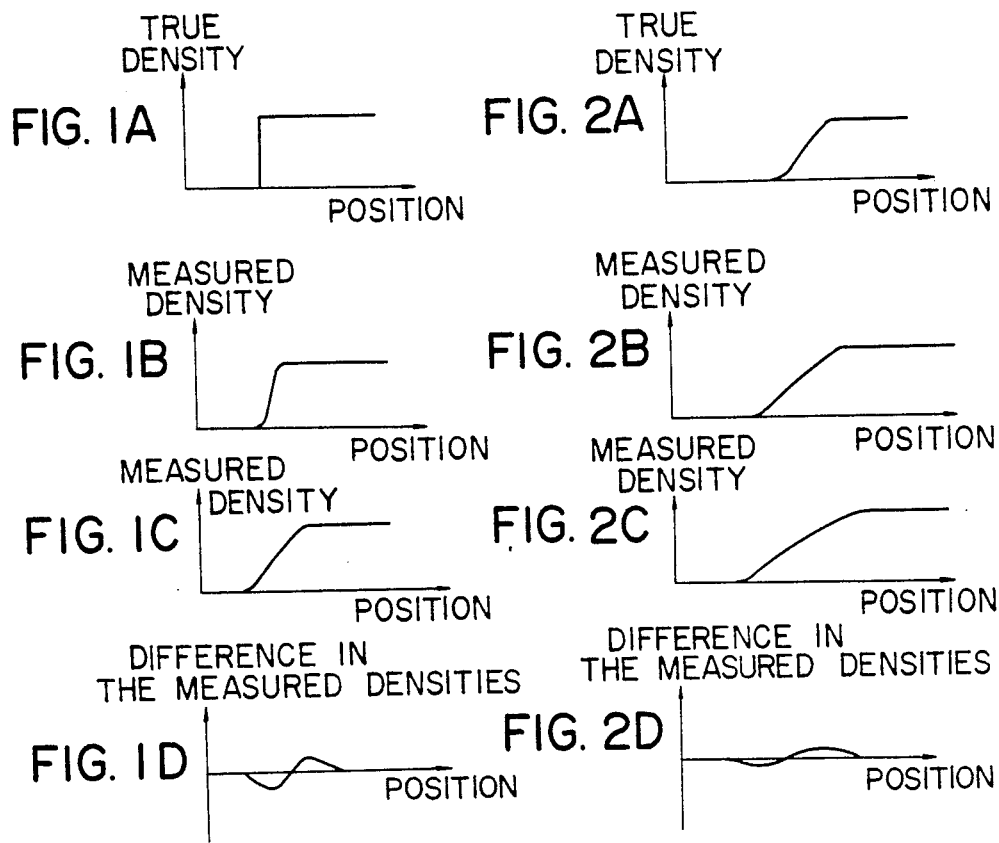
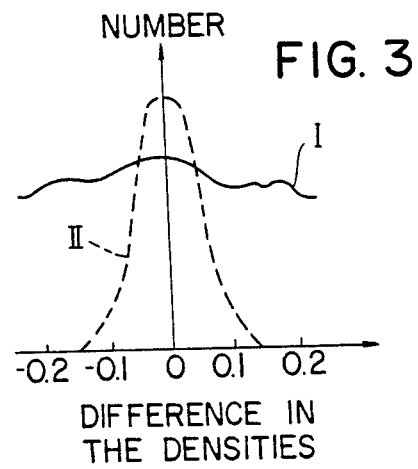

METHOD FOR DETECTING DEFOCUSED PHOTOGRAPHIC IMAGE

CROSS-REFERENCE TO RELATED APPLICATION

This application is a continuation in part of our prior application Ser. No. 379,989, filed on May 19, 1982, entitled "Method for Detecting Defocused Photographic Image", and now abandoned.

BACKGROUND OF THE INVENTION

This invention relates to a method to detect a defocused photographic image recorded on a photographic film.

When a photographic film is to be printed, it is necessary to remove such defocused images (blurred images) which are caused by improper focusing. There have been various methods for detecting such defocused photographic images in prior art.

In one method, defocused images are discriminated by detecting whether the spectral components thereof are within a predetermined domain of frequency by means of the Fourier Transform of the images or not. In this method, however, if the Fourier Transform is conducted optically, it requires a highly accurate, complex and expensive system while the Fourier Transform is conducted electrically, there are no Fourier Transform means available which are fast enough to suit for the photographic printer generally used.

In another method, photographic films are scanned linearly, the maximum density gradient within the high frequency band and the maximum density gradient of images blurred by removing the high space-frequency domain are obtained, the quotient of the two maximum density gradient is calculated. Then, the defocused images are detected by judging whether the obtained quotient is larger than the prescribed threshold value or not. (e.g. Japanese patent application Laid-open No. 70428/1978). The method, however, needs a large number of measurement points, thereby presenting difficulties in high-speed processing. Further, since the measurement of density largely depends on the scanning direction, it is difficult to obtain two-dimensional density gradients. The system is detrimental also in that it needs two circuits, i.e. a circuit to obtain the maximum value in the density gradients and the one to obtain the quotient of the two density gradients, making the system complicated.

SUMMARY OF THE INVENTION

Accordingly, an object of this invention is to provide a method for detecting the degrees of blurriness of film images recorded on a photographic film which is simple in construction and fast in operation. The present invention aims in particular at providing a method to securely detect defocused images even from the negative films which have less contrast or the flat negative films which have no contrasty edges on whole area.

Another object of this invention is to detect defocused images without requiring electric or optical Fourier Transform means but with a method which is inexpensive at cost. It also aims to detect blurred images without using the direction of a knife-edge contrast present in images but through treating the measured data two-dimensionally.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A through 1D are the graphs of an in-focus image, their measured density and the difference in the measured densities;

FIGS. 2A through 2D are graphs similar to FIGS. 1A through 1D to indicate a blurred or defocused image, respectively;

FIG. 3 is the measured distribution curve of pictures of both the in-focus and the defocused image;

DETAILED DESCRIPTION OF THE INVENTION

Figure 4:
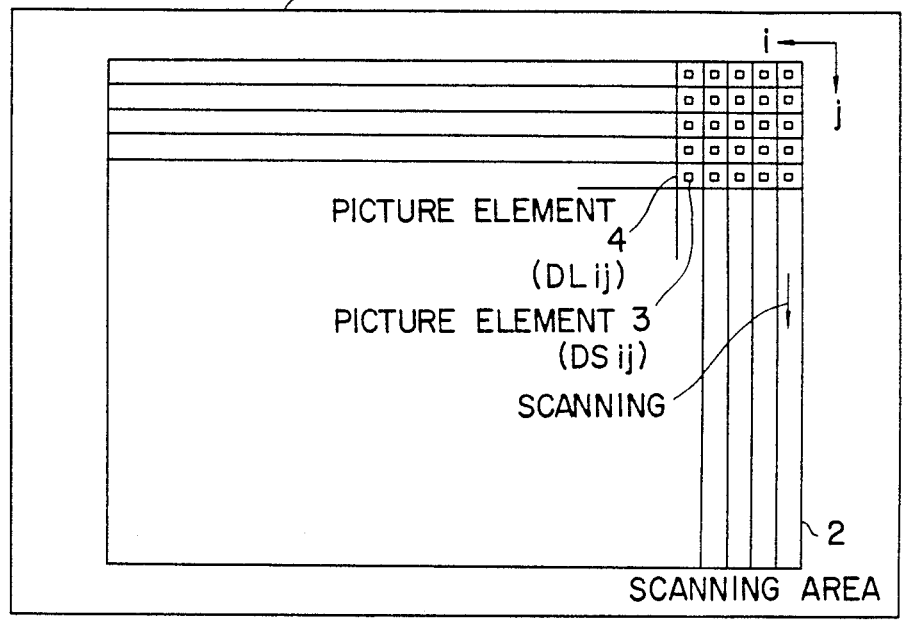
FIG. 4 shows the method of scanning by the photometric system according to this invention.

In this invention, the transmittivity or the transmission density of an image recorded on a photographic film is measured consecutively by scanning it with two photometric systems having different measuring areas, and a defocused photographic image is detected from the relation between the measured distribution of the difference between two measured values in the transmittivity or the transmission density and the contrast values which is obtained by totalling local contrasts measured all over the photographic film.

The focus of a lens in a camera is generally adjusted properly so as to record the main subject of a picture in critical sharpness. The major object is empirically known to be generally located substantially at the center of a picture. In the case of a photographic film taken by an amateur photographer, it is, therefore, desirable to scan the central portion of the picture to detect if any defocused image exists.

This invention will now be described in detail with reference to attached drawings.

FIGS. 1A–1D indicate the measurement of densities of an in-focus image wherein since a knife-edge image in an in-focus picture has a greater difference in density, the density gradient becomes as shown in FIG. 1A. When such an original image is scanned and measured by using two photometrical systems with different measurement areas, the density measured by the system with smaller measurement area becomes as shown in FIG. 1B while the one measured by the system with a larger area becomes as shown in FIG. 1C which shows a more gradual curve. The measurement area of such photometrical systems may be, for instance, 0.1 to 0.3 $mm^2$ on the original image in one system while 1 $mm^2$ in another.

The difference between the densities measured by two systems with different areas presents the curve as shown in FIG. 1D. Generally, such difference between two measured densities becomes larger for an in-focus image, the amplitude of the curve becomes a large value. Such density differences are processed to count the number existing in domains classified by a predetermined density amplitude. If the difference in density is plotted on the abscissa and the number is plotted on the ordinate, the characteristic curve I shown in FIG. 3 is obtained.

FIGS. 2A-2D indicate measurement of the same object as used in FIGS. 1A-1D, respectively, but the image is out-of-focus. Since the change in density is gradual at the edge in the case of a defocused image, the curve becomes as shown in FIG. 2A. If the edge image is measured by two photometric systems with different measurement areas, two gradual curves as shown in FIGS. 2C and 2B are obtained, the difference being as small as indicated in FIG. 2D. In a manner similar to the one mentioned above, the difference in measured densities is processed to obtain a measured distribution curve. Then, the characteristic curve II shown in FIG. 3 is obtained. As is obvious from the characteristics I and II of FIG. 3, there is a clear and distinct difference in the measured distribution curve between an in-focus image and a defocused image. Accordingly, if a characteristic value from which the difference becomes clear is used, it is possible to detect defocused images from such characteristic value. Pictures with a low contrast between the maximum and the minimum density or so-called flat negative films having no contrasty edges on whole area, however, might be judged as blurred one by this method even though it is correctly focused. This inconvenience is attributable to the fact the system judges the degree of blurriness by a volume equal to the multiple of the gradient of an edge present in the picture and the contrast.

In order to avoid aforementioned demerits, this invention provides a method which combines data corresponding to respective edges all over the picture with the measured distribution curve of density difference so as to be able to judge the degree of blurriness comprehensively. FIG. 4 shows the relation between the scanning region 2 of two photometric systems used for this invention corresponding to a negative film 1 and the smaller picture element 3 and the larger picture element 4 which is concentric to the smaller element, those two elements being the locations of sampling within the domain 2. The smaller and larger picture elements 3, 4 are made to be optically measured on a same sampling point on the negative image 1 in two types, i.e. one larger and one smaller of spot sizes. The total area of the scanning area 2 may be scanned, for instance, by scanning vertically and consecutively all columns i one by one. If the measured density at column i and row j in the smaller picture element 3 is $DS_{ij}$ and the measured density at column i and row j in the larger picture element 4 is $DL_{ij}$, the difference between picture elements, $\Delta D_{ij}$ is obtained by the following equation (1).

$$\Delta D_{ij} = |DL_{ij} - DS_{ij}| \ldots \quad (1)$$

Figure 5:
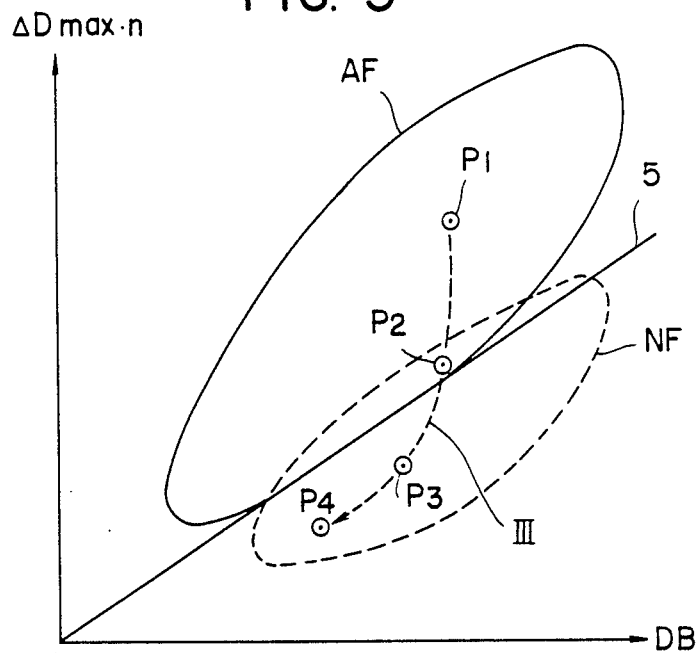
FIG. 5 is a characteristic view to indicate the relation between the measured distribution curve of the difference between two types of transmittivities (or transmission densities) and the total of local contrasts by means of a line separating blurred images from sharp ones.

The value $D_{max \cdot n}$ which is the nth $(1-m/2)$ from the maximum among the differences $\Delta D_{ij}$ corresponding to all picture elements (for instance, in the number of m) is plotted on the ordinate axis as shown in FIG. 5. Then, the absolute value DB of the density difference between adjacent sampling points (vertical and horizontal) either in the smaller picture element 3 or in the larger picture elements 4 is obtained by the following equation.

$$DB = \sum_{i,j} |DL_{i,j} - DL_{i+1,j}| + \sum_{i,j} |DL_{i,j} - DL_{i,j+1}| \quad (2)$$

or $$DB = \sum_{i,j} |DS_{i,j} - DS_{i+1,j}| + \sum_{i,j} |DS_{i,j} - DS_{i,j+1}| \quad (3)$$

The value DB obtained from the aforementioned equation (2) or (3) is plotted on the abscissa axis as shown in FIG. 5. Then, the relation between such value and the density difference $\Delta D_{ij}$ can determine the region of in-focus images as shown by the reference character AF and the area of defocused images as shown by the reference character NF. This is because the value DB indicates the total of local contrasts of an image. In other words, the larger is the contrast, the larger becomes the value DB while the density difference $\Delta D_{ij}$ indicates the intensity of edges in the picture.

A characteristics line 5, therefore, can be predetermined to demarcate the in-focus area AF from the defocused area NF. Any negative film can be judged easily and quickly whether the images on it is in- or out-of-focus simply by applying its characteristic point P of $\Delta D_{max \cdot n} - DB$ on FIG. 5. As the blurriness increases in a single picture, the characteristics curve III shown in FIG. 5 can be obtained. That is, it shows that the image is properly focused at the point $P_1$ but is on the boundary line at the point $P_2$ and becomes completely out-of-focus at the points $P_3$ and $P_4$.

The spot size on the both larger and smaller picture elements may be preferable in practice to be 1 mm$^2$ and 0.1–0.3 mm$^2$ for 35 mm-films, respectively. Further, the smaller spot may be decreased in size to fit for minute patterns. It is preferable to scan at smaller scanning intervals and may be practical to scan so that larger picture elements are not overlapped. The sampling may be conducted either uniformly on the whole surface or with a greater density at the central portion. Although in the above-mentioned example the density difference $\Delta D_{ij}$ at the nth from the maximum is plotted on the ordinate axis, it may be the average of the density differences from the maximum to the nth. In addition, the contrast value plotted on the abscissa axis may be the density difference between any adjacent points at a suitable interval therebetween. For instance, it can be $$DB = \sum_{i,j} |DL_{i,j} - DL_{i+n,j}| + \sum_{i,j} |DL_{i,j} - DL_{i,j+1}| \quad (4)$$

wherein $n = 2, 3, 4 \ldots$

Or it can even be simplified to be the difference between the maximum value and the minimum value either at $DL_{ij}$ or at $DS_{ij}$.

Figure 6:
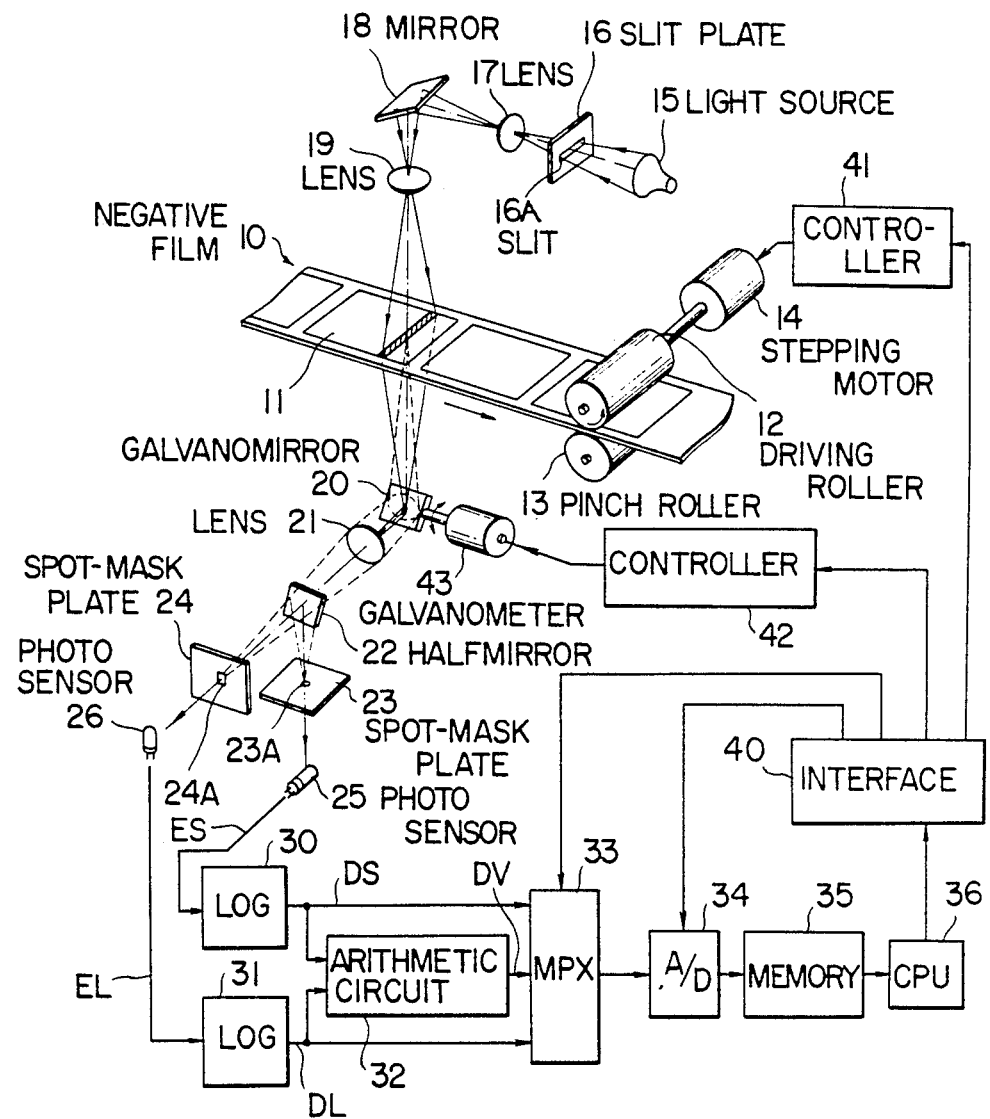
FIG. 6 is a schematic view, partly as a block diagram, showing one embodiment of a device according to the invention for detecting defocused photographic image.

An embodiment of a device according to the above-mentioned method will now be described with reference to FIG. 6.

A negative film 10 has a plural number of negative pictures 11 which are successively arranged in rows, is held between a driving roller 12 and a pinch roller 13 and is transported to the direction indicated by an arrow mark in the figure by driving a stepping motor 14 coupled with the driving roller 12. The light from a light source 15 passes through an elongated slit 16A provided on a slit plate 16 and a lens 17 to be irradiated on the negative picture 11 on the negative film 10 in a form corresponding to the slit 16A (hatched portion). The transmitted light therefrom is reflected on a galvanomirror 20 provided underneath the negative film 10. The light reflected from the mirror 20 is irradiated through an imaging lens 21 on a halfmirror 22. The light reflected on the mirror 22 is irradiated on a spot-mask plate 23 while the light transmitted therethrough is irradiated on a spot-mask plate 24. An aperture 23A of about 0.1 to 0.3 mm² is arranged on the irradiated zone on the plate 23 while an aperture 24A of about 1.0 mm² on that of the plate 24. The light transmitted through the apertures 23A and 24A is detected by photo-sensors 25 and 26, respectively.

The light having transmitted through the larger and the smaller apertures 23A and 24A is converted into electric signals ES and EL according to the quantity of light thereof to be inputted in logarithmic circuits 30 and 31 so that they can be converted to density signals DS and DL which are proportionate to the density of the negative picture 11. The density signals DS and DL are inputted to an arithmetic circuit 32 to obtain an absolute value DV of the density difference as well as to be inputted to a multiplexer 33. The output from the multiplexer 33 is converted to a digital value by an Analog-to-Digital converter 34 and then is stored in a memory 35. A computer 36, for example a micro-computer or central processing unit, reads out the density data for a picture frame which has been stored in the memory 35 in order to compute the $D_{max \cdot n}$ and DB values and discriminate whether the picture is defocused picture or not. The computer 36, besides conducting the discriminating operation of defocused pictures, time-controls the multiplexer 33 and the A/D converter 34 through an interface 40, drive-controls the stepping motor 14 through an controller 41, and drive-controls a galvanometer 43 through a controller 42 in order to control the sampling density in scanning.

As is clear from the description above, this invention provides a method to discriminate defocused images on a photographic film from the relation between the measured distribution of density difference and the total of local contrasts, which can be efficiently applied to low contrast negative films or flat negative films. Even in such types of negative films wherein difference in density is small, the total of local contrasts becomes proportionately smaller, and the ratio between them remains within a scope determinable by the degree of blurriness irrespective of picture patterns. The measured data in this method is processed two-dimensionally and therefore facilitates the judgement/discrimination of defocused photographic images without depending on the direction of edges present in the picture.

Hence obvious changes may be made in the specific embodiment of the invention described herein, such modifications being within the spirit and scope of the invention claimed. It is indicated that all matters contained herein are intended as an illustrative and not as limiting in scope.

What is claimed is:

1. A method for detecting a defocused photographic image comprising the steps of: measuring a transmittivity or a transmission density of an image recorded on a photographic film by consecutively measuring same by scanning with two photometric systems having different measuring areas; calculating measured distribution of differences between two measured values in the transmittivity or the transmission density; obtaining contrast values which have been obtained by totalling local contrasts which have been measured all over said photographic film; detecting a defocused photographic image from a determination of the relationship between said measured distribution of differences and said contrast values; wherein when the number of measurement spots used by said photometric systems is m (wherein m>2), calculating said measured distribution comprises the step of calculating either an averaged value of absolute values or an averaged value of n (wherein $1 \leq n < m/2$) absolute values from a maximum value.

2. A method for detecting a defocused photographic image comprising the steps of: measuring a transmittivity or a transmission density of an image recorded on a photographic film by consecutively measuring same by scanning with two photometric systems having different measuring areas; calculating measured distribution of differences between two measured values in the transmittivity or the transmission density; obtaining contrast values which have been obtained by totalling local contrasts which have been measured all over said photographic film; detecting a defocused photographic image from a determination of the relationship between said measured distribution of differences and said contrast values; wherein, when the number of the measurement spots used by said photometric systems is m (wherein m>2), calculating said measured distribution comprises the step of calculating an nth absolute value from a maximum value (wherein $1 \leq n < m/2$).

3. A method for detecting defocused photographic image which comprises the steps of: optically scanning a photographic film, said film being scanned optically in two concentric picture elements consisting of a larger picture element and a smaller picture element, with different measuring areas; and, when a transmittivity or a transmission density at column i and row j of said larger picture element is $DL_{ij}$ while a transmittivity or a transmission density at column i and row j of said smaller picture element is $DS_{ij}$, a difference between them $D_{ij}$ is calculated by the following equation:

$$\Delta D_{ij} = |DL_{ij} - DS_{ij}|;$$

and then a value $D_{max \cdot n}$ at an nth $(1 - m/2)$ from a maximum of the difference $\Delta D_{ij}$ corresponding to all picture elements m is plotted on a first axis while an absolute value DB of a density difference between respective adjacent sampling points either in said larger picture element or in said smaller picture element, $$DB = \sum_{i,j} |DL_{i,j} - DL_{i+1,j}| + \sum_{i,j} |DL_{i,j} - DL_{i,j+1}|$$

or $$DB = \sum_{i,j} |DS_{i,j} - DS_{i+1,j}| + \sum_{i,j} |DS_{i,j} - DS_{i,j+1}|$$

is plotted on a second axis; and defocused images on said photographic film are detected from a determination of the distribution of said $D_{max \cdot n}$ and DB.

4. A method for detecting a defocused image as claimed in claim 3, wherein defocused images are detected by the step of first pre-plotting a predetermined separating line within a region defined by said first and second axes so as to discriminate between an in-focus area and a defocused area.

5. A method for detecting a defocused image as claimed in claim 3, wherein said value DB is $$DB = \sum_{i,j} |DL_{i,j} - DL_{i+n,j}| + \sum_{i,j} |DL_{i,j} - DL_{i,j+n}|$$

or

-continued
$$DB = \sum_{i,j} |DS_{i,j} - DS_{i+n,j}| + \sum_{i,j} |DS_{i,j} - DS_{i,j+n}|$$

wherein n=2, 3, 4 . . .

6. A method for detecting a defocused image as claimed in claim 3, wherein said larger picture element or smaller picture element is formed square, respectively.

7. The method for detecting defocused image as claimed in claim 4, wherein said value DB is $$DB = \sum_{i,j} |DL_{i,j} - DL_{i+n,j}| + \sum_{i,j} |DL_{i,j} - DL_{i,j+n}|$$

or $$DB = \sum_{i,j} |DS_{i,j} - DS_{i+n,j}| + \sum_{i,j} |DS_{i,j} - DS_{i,j+n}|$$

wherein n=2, 3, 4 . . .

8. A method for detecting a defocused image as claimed in claim 7, wherein said larger picture element or smaller picture element is formed square, respectively.

9. A method for detecting a defocused image as claimed in claim 5, wherein said larger picture element or smaller picture element is formed square, respectively.

* * * * *